June 6, 1950 — R. C. DEHMEL — 2,510,384
COORDINATE CONVERSION AND VECTOR APPARATUS
Filed Oct. 25, 1944

INVENTOR.
RICHARD CARL DEHMEL

Patented June 6, 1950

2,510,384

UNITED STATES PATENT OFFICE 2,510,384

COORDINATE CONVERSION AND VECTOR APPARATUS

Richard Carl Dehmel, Short Hills, N. J.

Application October 25, 1944, Serial No. 560,288

3 Claims. (Cl. 35—10.2)

This invention relates to electric computing apparatus and more particularly to improved apparatus for transforming voltages representing Cartesian coordinates into voltages designating equivalent polar coordinates.

The invention applies to mechanism for indicating, according to polar coordinates, the position of a movable object, such, for example, as an airplane, ship, target, or any other object, the location or course of which must be accurately charted.

One application of the invention is to a training device adapted to simulate the flight of an aircraft with respect to the beam signals of a simulated directional radio range. This application is illustrated herein for the purpose of describing my invention. In the referred to training device, signals are varied by mechanism operated according to the path of the simulated flight and more particularly in accordance with the instant range R, and azimuth angle $\theta$, of the simulated aircraft from a reference point and direction, respectively. The construction and design of the trainer are such that voltages are derived which vary according to the Cartesian coordinates of the instant position of the simulated aircraft along axes representing latitude and longitude. The present invention provides means whereby these Cartesian coordinate voltages may be converted to control voltages for establishing the values of R and $\theta$ to control said signalling mechanism.

In trainers of the type above referred to, it has been found very advantageous to also utilize polar coordinate mechanism for charting the course of the simulated aircraft because the apparatus is cheaper, more compact, and simpler than mechanism having rectilinear motions, and, it is an object of this invention to provide an improved apparatus for converting voltages representing Cartesian coordinates into control voltages determinative of the equivalent polar coordinates to operate such charting and signalling instrumentalities.

It is a further object of this invention to provide apparatus responsive to the polar coordinate control voltages to actuate mechanism according to the values of R and $\theta$.

Another object is to provide an electro-mechanical indicating or recording device for charting any function having as parameters the polar coordinates R and $\theta$ representing instant polar distance and angle respectively.

A feature of the invention is that Cartesian coordinate representing voltages are converted to polar control voltages by means of a simple rotary transformer having two electrically quadrature windings on both its rotor and stator.

In accordance with this feature a pair of Cartesian coordinate representing voltages $E_x$ and $E_y$, may be transformed into control voltages having values, $$k_1(\pm E_x \sin \theta \pm E_y \cos \theta) \cos d\theta \quad \text{Equation 1}$$

and, $$k_2(\pm E_x \cos \theta \pm E_y \sin \theta) \sin d\theta \quad \text{Equation 2}$$

which correspond respectively to polar range and azimuth control voltages $E_r$ and $E_\theta$ to be used as hereinafter described for establishing the magnitude of the range and the angle $\theta$ representing the desired azimuth angle. The deviation from said desired angle is $d\theta$ and the terms $k_1$ and $k_2$ are factors of proportionality effected by various design considerations in the rotary transformer, such as turns ratio, magnetic coupling and the like.

A further feature of the invention is the provision of servo-motor means controlled by the polar azimuth control voltage to adjust the rotary transformer to bring the azimuth control voltage to zero and thereby determine the azimuth angle $\theta$.

Another feature of the invention is the provision of second servo-motor means controlled by the polar range control voltage for positioning mechanism according to the polar range.

An additional feature of this invention resides in the use of a rotary transformer having two pairs of two-phase windings, one pair on the rotor and the other on the stator, for reducing two voltage components into a voltage representing the resultant of these components and into a control voltage for establishing the angle of the resultant with respect to a reference value.

These and other objects and features are accomplished by the invention hereinafter described and illustrated in the accompanying drawing in which.

Figures 1, 2:
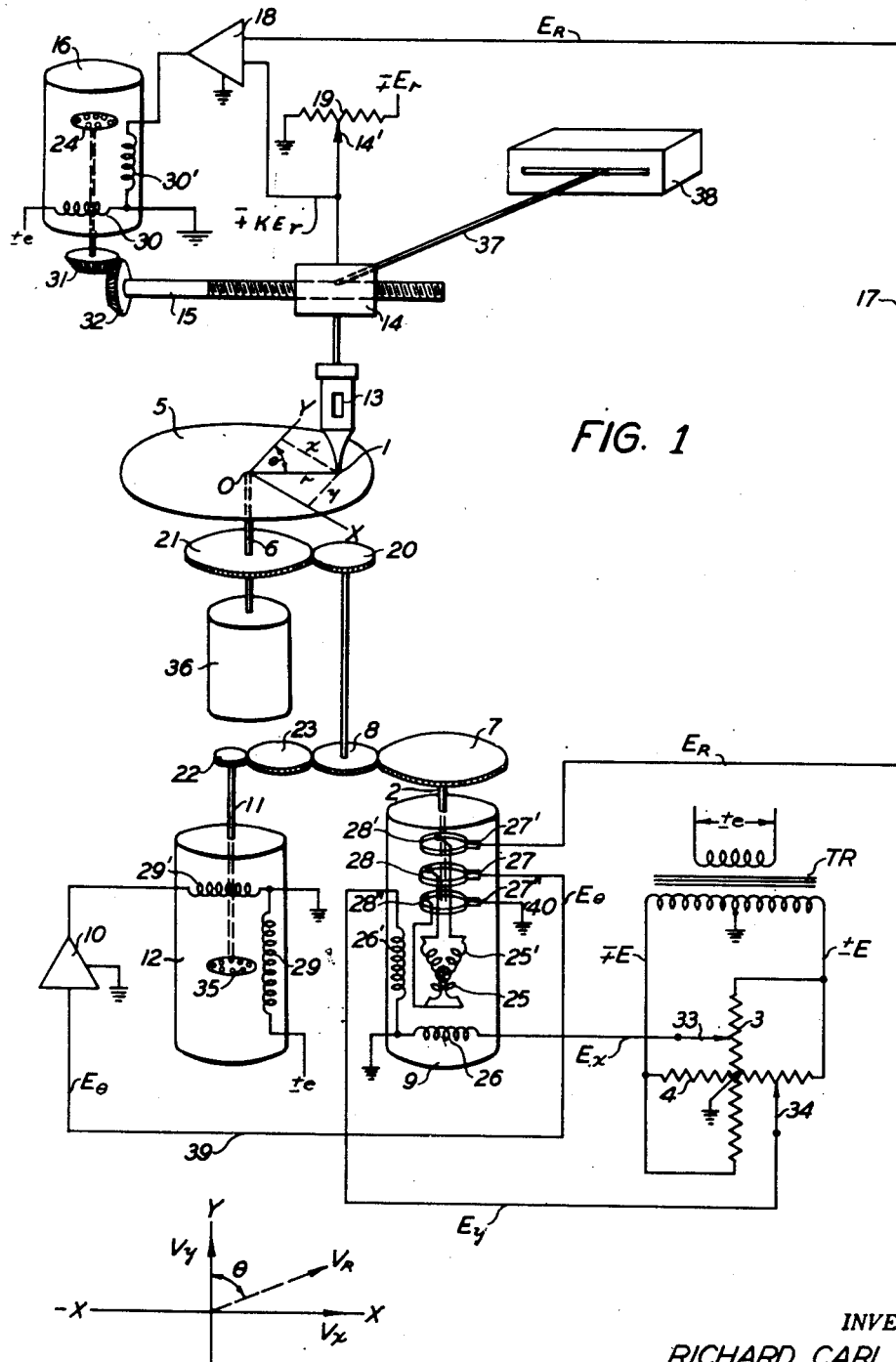
Fig. 1 shows a diagrammatic view of an apparatus constructed in accordance with one embodiment of this invention.
Fig. 2 is a schematic diagram of voltage vectors which have a resultant and angle that may be computed by the apparatus of Fig. 1.

In the drawing and the following detailed description, my invention is illustrated as applied to a course charting and signalling mechanism operating in polar coordinates with impressed Cartesian coordinate voltages $E_x$ and $E_y$ derived from potentiometers 3 and 4 energized from a source, ±e, in a manner described in detail hereinafter. In Fig. 1, the rotary transformer 9, embodies two pairs of polyphase windings, one pair consisting of the two-phase windings 25 and 25' which are mounted for rotation with shaft 2, and the second pair consisting of the two-phase windings 26 and 26' which are stationary. Voltage at windings 25 and 25' is transmitted by brushes 27, 27' and 27'' through rings 28, 28' and 28'', respectively. Brush 27'' is grounded through lead 40. The windings 26 and 26' are energized by voltages $E_x$ and $E_y$ each having a parameter such as potential or current representing, respectively, the instant Cartesian coordinates of the position of a point or object 1 with respect to axes X and Y. The voltages $E_x$ and $E_y$ may be derived from any source such as the potentiometers 3 and 4 energized by transformer TR operated from a voltage ±e, having a phase which serves as reference for the system. The secondary of transformer TR deliver voltages ±E and ∓E which have potentials of equal magnitude but of opposite instant polarity. The voltages ±E and ∓E are impressed on potentiometers 3 and 4 having slidably adjustable brushes 33 and 34 for respectively selecting voltages $E_x$ and $E_y$ from said potentiometers to represent the Cartesian position coordinates of point or object 1 with respect to axes X and Y. If the potentiometers are so shaped that the potentials or currents at the brushes change as linear parameters with the position of said brushes, the brush setting will be directly proportional to Cartesian position coordinates and the instant phase of the voltage $E_x$ and $E_y$ will correspond to the quadrant position of the point 1.

With the connections shown in Fig. 1, the windings 25 and 25' will respectively have induced in them, voltages $E_R$ and $E_\theta$ each having a parameter, such as potential or current representing, as above described, the range and azimuth control voltages. It is to be clearly understood that the connections between windings may be reversed with equally satisfactory operation, that is, the voltages $E_x$ and $E_y$ may be impressed on the movable windings 25 and 25', whereupon the voltages $E_R$ and $E_\theta$ are derived from the stationary coils 26 and 26'. Although the voltages induced in the secondary windings 25 and 25' are used as control voltages for Cartesian-to-polar conversion in the present instance, it will be apparent that these voltages are actually in quadrature relation as are the voltages in the primary windings 26 and 26', the effect of relative rotation of the quadrature windings being to shift the axes to which the induced quadrature voltages may be referred through the angle of relative rotation, such as the angle $\theta$.

Gears 7, 8, 20 and 21 connect shaft 2 in unity ratio to shaft 6 to which is attached the charting surface 5. Pen 13 charts the course of the moving point or object 1 by indicating or recording the path thereof on chart 5. Shaft 6 also positions the azimuth responsive unit 36 of the signalling mechanism of the trainer. The details of this azimuth responsive unit of the signal controlling device are described in my United States Patent No. 2,494,508, dated January 10, 1950, but these details are not essential to the understanding or operation of the present invention.

A servo-motor 12, having rotor 35 is adapted to drive shaft 6 through gears 22, 23, 8, 20 and 21. The motor 12 may conveniently be a two-phase motor having a winding 29 energized from the reference source of voltage ±e, and a quadrature winding 29' energized from amplifier 10 according to the amplitude and phase of the control voltage $E_\theta$ derived from winding 25 of the rotary transformer 9. The amplifier 10 includes the necessary 90° phase shifting circuit as is well known to be required for operation of the 2-phase motor 12. While a two-phase motor is shown in the drawing, it will be apparent to those skilled in this art, that a direct current motor may be employed for this purpose by using a demodulator-amplifier at 10, and similarly, there may be substituted any of numerous other forms of reversible motive devices which are responsive to an alternating voltage such as $E_\theta$ having phase and potential as varying parameters.

It will be clear from the above, that with suitable polarization of servo-motor winding 29, the motor 12 will operate in one direction or the other, depending on the phase of $E_\theta$ with respect to the reference phase of the voltage ±e, and that chart 5 and shaft 2 will thereby be rotated until the transformer winding 25' is so positioned with respect to windings 26 and 26', energized by $E_x$ and $E_y$, respectively, that the potential $E_\theta$ is reduced to zero. According to Equation 1 above, the angular position of shaft 6, established by the foregoing servo-action, will then be the desired azimuth angle $\theta$ representing the direction of the object 1 from the reference line Y. To prevent hunting of the servo about the reference angle $\theta$, the servo system may be damped by the well-known expedient of deriving an inverse velocity feedback voltage from a polyphase generator operated by motor 12 and applying this potential as an input to amplifier 10. It is to be understood that while the reference value for the voltage $E_\theta$ has been taken as zero for determining the angle $\theta$ in this description, the circuit may be adapted to employ some other bias data by adding an equivalent fixed inverse potential to the input of amplifier 10.

A second servo-motor 16, having rotor 24 and two-phase windings 30 and 30' drives lead screw 15 through gears 31 and 32 to position nut 14 carrying pen 13 or a stylus, insulated contact 14', and connecting member 37 which operates the range unit 38 of the signalling mechanism above referred to. The details of said signalling mechanism are described in my United States Patent No. 2,494,508 dated January 10, 1950 but these details are not necessary to the understanding or operation of the present invention.

Contact 14' selects a voltage from potentiometer 19 in accordance with the distance which nut 14 and stylus 13 are from the origin O. The potentiometer 19 is energized by a voltage ∓$E_r$ of fixed maximum potential and instantly opposite polarity to ±$E_R$, that is, voltage $E_r$ is of opposite sense to $E_R$. Amplifier 18 is a summing amplifier which provides an output current proportional to the algebraic sum of voltages ±$E_R$ and ∓$KE_r$ where K is the ratio of the voltage selected by wiper 14' to ∓$E_r$. The output of amplifier 18 energizes winding 30' which controls the speed and direction of motor 16. Winding 30 is energized from the reference source of voltage ±e. It will now be understood that servo-motor 16 will operate to adjust brush 14', the stylus or pen 13 and the signalling mechanism range unit arm 37 until the resultant of voltages ±$E_R$ and ∓$KE_r$ is zero which balance point corresponds precisely to the polar range $r$ which the object or point 1 is from origin O. This servo may also be damped, if desired, by velocity feedback in the well-known manner.

In combination, then, the servo-motors 12 and 16 controlled by the control voltages ±E_R and ±E_θ, derived from voltages E_x and E_y by means of rotary transformer 9, will continuously and instantly move the mechanism including elements 6 and 14 and their associated parts according to the Cartesian coordinate voltages E_x and E_y which have phase and potential as the parameters that are varied to represent all positions of said point 1 with respect to axes X and Y intersecting at origin O.

The current in the windings of the rotary transformer is also to be understood as being a parameter which varies in representing different coordinate conditions.

For the purpose of illustrating vector composition, or resolution, reference is made to Figure 2 wherein X and Y are Cartesian reference axes, and V_x and V_y respectively represent components of voltage along said axes. The resultant of said components is V_R which makes an angle θ with respect to the Y axis used as a reference direction. It will be clear that any parameter of a voltage may be represented by the components V_x and V_y. For example, the parameters may be potential, current, or resultant phase. The voltages V_x and V_y may be derived by potentiometer apparatus similar to that shown in Figure 1 for deriving voltages E_x and E_y or any other form of variable electrical means such as "Variacs," condensers and the like, may be used for the purpose. The apparatus illustrated in Figure 1 may be employed for composing the vectors V_x and V_y into a resultant voltage V_R and a control voltage V_θ, the latter for determining the angle θ. For this purpose the potential V_x is connected to winding 26 instead of the potential E_x. Likewise, the voltage V_y is connected to winding 26' instead of energizing this winding by the voltage E_y.

Operation of the servos 12 and 16 for determining θ and composing V_x and V_y into a voltage V_R and also positioning such elements as shaft 6 and nut 14 to represent θ and the parameter of V_R respectively, will be similar to the operation previously described for the determination of θ with E_R.

Clearly, the apparatus of Fig. 1 may also be employed to indicate or record any function having polar parameters R and θ, the value of R being expressed as a voltage ±e_R applied to lead 17 for energizing amplifier 18. Simultaneously, a control voltage ±e_θ for establishing the value of θ is impressed on lead 39 to energize amplifier 19. It is to be understood that the voltage e_θ may be derived from a rotary transformer of the character above described or a rotary transformer having one two-phase winding and one single-phase winding, said windings being rotatable with respect to each other and said two-phase winding being energized by a pair of voltages such as E_x and E_y having a resultant at the angle θ.

Having thus described my invention and having illustrated various modifications thereof, it will be obvious to those skilled in the art, after now understanding my invention, that other changes and modifications may be made therein without departing from the spirit and scope of my invention, and I aim in the appended claims to cover such changes and modifications as are within the scope of the invention.

What I claim is:

1. Apparatus for charting the course of a point, said apparatus being responsive to potentials E_x and E_y representing respectively the instant Cartesian position coordinates of said point and comprising an azimuth unit and a range unit movable in accordance with equivalent polar coordinates R and θ of the point, said coordinate R representing the distance of the point from a reference origin and θ representing the angle subtended between said point, the origin and a reference direction; means for operating said apparatus comprising an adjustable electromagnetic coordinate conversion device the adjustment of which corresponds to the angle θ, said device being energized by the potentials E_x and E_y for inductively deriving potentials E_R and E_θ, said potential E_R corresponding to the polar coordinate R and the potential E_θ varying from a minimum value according to the deviation of the adjustment of said device from the angle θ, means responsive to the control potential E_θ for changing said adjustment until the potential E_θ is minimized, an operative connection between said device adjusting means and the azimuth unit to move said azimuth unit in accordance with the angle θ and means for moving the range unit in accordance with the distance R, said last named means including a servo motor operatively connected to said range unit and to variable electrical means for deriving a voltage having a parameter varying in accordance with the distance R and in opposite sense to that of potential E_R, and means for controlling said servo motor responsive to the instant values of said last-named voltage and the potential E_R.

2. Apparatus for charting the course of a moving point, said apparatus being responsive to potentials E_x and E_y representing respectively the instant Cartesian position coordinates of said point and including a charting surface and a stylus associated therewith, means comprising an azimuth servo-motor unit and a range servo-motor unit movable in accordance with equivalent polar coordinates R and θ of the point, said means adapted to produce relative motion between said stylus and surface in accordance with the values of R and θ, said coordinate R representing the distance of the point from a reference origin and θ representing the angle subtended between said point, the origin and a reference direction; means for operating said servo-units comprising, a rotary transformer the rotation of which corresponds to the angle θ, said transformer being energized by the potentials E_x and E_y for inductively deriving potentials E_R and E_θ, said potential E_R corresponding to the polar coordinate R and the potential E_θ being a control potential varying from a minimum value according to the deviation of the rotation of said device from the angle θ, an electrical circuit between the transformer and azimuth servo for energizing said azimuth servo in speed and direction of movement according to the voltage E_θ, variable electrical means for deriving a potential KE_rV in accordance with the movement of the range servo having a polarity opposite to E_R, and an electronic circuit responsive to the opposing potentials KE_r and E_R for energizing said range servo to maintain said range unit at a position producing equilibrium between the effects of said opposing potentials on said circuit.

3. Electric charting apparatus comprising means for deriving voltages E_x and E_y having parameters respectively representing Cartesian position coordinates x and y of a point having equivalent polar coordinates R and θ, said polar coordinate R representing the distance of said point from a reference origin and θ representing the angle subtended between said point, the origin and a reference direction: adjustable electromagnetic coordinate conversion means the adjustment of which corresponds to the angle $\theta$, said electromagnetic means being energized according to the respective parameters of the $E_x$ and $E_y$ voltages for inductively deriving a voltage $E_R$ and a control voltage $E_\theta$, said voltage $E_R$ having a parameter corresponding to the value of the polar coordinate R, and said voltage $E_\theta$ having a parameter varying from a reference value according to the deviation of the adjustment of said electromagnetic means from the adjustment corresponding to the angle $\theta$, means responsive to the control voltage $E_\theta$ for changing said adjustment until the parameter of $E_\theta$ equals said reference value, an azimuth element positioned by the adjusting means responsive to voltage $E_\theta$, an adjustable range element and means responsive to the voltage $E_R$ for adjusting said range element corresponding to the distance R, said means for adjusting the range element comprising a servomotor operatively connected to the range element and to variable electrical means for deriving a voltage $KE_r$ having a parameter varying in accordance with the range R and in opposite sense to the parameter of the range representing voltage $E_R$, and means for controlling the servomotor comprising a motor control circuit responsive to the instant values of the range representing parameters of the voltages $E_R$ and $KE_r$.

RICHARD CARL DEHMEL.

REFERENCES CITED

The following references are of record in the file of this patent:

UNITED STATES PATENTS

| Number | Name | Date |
|---|---|---|
| 1,685,973 | Alexander | Oct. 2, 1928 |
| 1,745,933 | Kauch | Feb. 4, 1930 |
| 1,985,265 | Smith | Dec. 25, 1934 |
| 2,080,186 | Reymond | May 11, 1937 |
| 2,164,412 | Koster | July 4, 1939 |
| 2,179,663 | Link | Nov. 14, 1939 |
| 2,229,069 | Geyger | Jan. 21, 1941 |
| 2,308,566 | Noxon | Jan. 19, 1943 |
| 2,346,693 | Lyman | Apr. 18, 1944 |
| 2,366,603 | Dehmel | Jan. 2, 1945 |
| 2,389,359 | Grow | Nov. 20, 1945 |
| 2,399,726 | Doyle | May 7, 1946 |
| 2,404,387 | Lovell | July 23, 1946 |
| 2,408,081 | Lovell | Sept. 24, 1946 |
| 2,465,624 | Agins | Mar. 29, 1949 |
| 2,467,646 | Agins | Apr. 19, 1949 |
| 2,468,179 | Darlington | Apr. 26, 1949 |

FOREIGN PATENTS

| Number | Country | Date |
|---|---|---|
| 164,765 | Great Britain | June 23, 1921 |
| 384,971 | Great Britain | 1931 |
| 540,736 | Great Britain | 1941 |
| 633,493 | Germany | Aug. 3, 1936 |